(12) United States Patent
Meziache

(10) Patent No.: US 9,516,454 B2
(45) Date of Patent: Dec. 6, 2016

(54) NEAR-FIELD COMMUNICATION SYSTEM TERMINAL

(71) Applicant: STMicroelectronics (Rousset) SAS, Rousset (FR)

(72) Inventor: Thierry Meziache, St. Maximin la Sainte Baume (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 14/629,077

(22) Filed: Feb. 23, 2015

(65) Prior Publication Data

US 2015/0172851 A1 Jun. 18, 2015

Related U.S. Application Data

(63) Continuation-in-part of application No. PCT/FR2013/051913, filed on Aug. 8, 2013.

(30) Foreign Application Priority Data

Aug. 24, 2012 (FR) ..................... 12 57981

(51) Int. Cl.
| | |
|---|---|
| H04B 5/00 | (2006.01) |
| H04W 4/00 | (2009.01) |
| G06K 7/10 | (2006.01) |
| G06K 19/07 | (2006.01) |
| H04B 1/69 | (2011.01) |

(52) U.S. Cl.
CPC .......... *H04W 4/008* (2013.01); *G06K 7/10306* (2013.01); *G06K 19/0715* (2013.01); *H04B 1/69* (2013.01); *H04B 5/0068* (2013.01)

(58) Field of Classification Search
None
See application file for complete search history.

(56) References Cited

U.S. PATENT DOCUMENTS

| | | | | |
|---|---|---|---|---|
| 6,091,935 | A * | 7/2000 | Alexander | G06K 19/0723 455/41.1 |
| 6,650,229 | B1 * | 11/2003 | Wuidart | G06K 19/0701 340/10.2 |
| 7,986,916 | B2 * | 7/2011 | Williams | G06K 7/0008 340/854.8 |
| 8,050,651 | B2 * | 11/2011 | Kawabata | H03F 3/45179 455/343.5 |
| 8,489,020 | B2 * | 7/2013 | Bangs | H04B 5/0012 343/867 |
| 8,565,675 | B2 * | 10/2013 | Bangs | G06K 7/0008 330/252 |
| 8,971,804 | B2 * | 3/2015 | Butler | G06K 19/0701 455/127.1 |
| 9,026,046 | B2 * | 5/2015 | Lefley | ............ 455/102 |
| 2009/0011706 | A1 | 1/2009 | Wilson et al. | |

FOREIGN PATENT DOCUMENTS

| | | |
|---|---|---|
| DE | 10 2009 045 186 A1 | 4/2011 |
| EP | 2 388 930 A2 | 11/2011 |

* cited by examiner

*Primary Examiner* — Tuan A Tran
(74) *Attorney, Agent, or Firm* — Seed IP Law Group LLP

(57) ABSTRACT

A terminal of a near-field communication system, including at least one element for spreading the spectrum of a received signal.

17 Claims, 3 Drawing Sheets

NEAR-FIELD COMMUNICATION SYSTEM TERMINAL

BACKGROUND

Technical Field

The present disclosure relates to near-field communication systems (NFC), and to terminals used in such systems.

Description of the Related Art

In a near-field communication system, a terminal (or read and write terminal) communicates without contact and wirelessly with a transponder (or transceiver), for example, a chip card or an electronic tag (TAG).

A disadvantage of existing systems is that the receive circuit of the terminal sees the voltage across the antenna. Now, this voltage may be very high due to the overvoltage factor introduced by the oscillating transmit circuit. To avoid exceeding the voltage applied to the receive circuit, the excitation voltage of the oscillating circuit generally has to be limited. This results in limiting the system range.

BRIEF SUMMARY

An embodiment facilitates increasing the excitation voltage of the oscillating circuit of a near-field communication system terminal.

Another embodiment facilitates increasing the range of a near-field communication system.

An embodiment provides a near-field communication system comprising at least one element for spreading the spectrum of the received signal.

According to an embodiment, the terminal comprises an antenna, common to the transmission and to the reception, connected to at least one input terminal of a control and processing circuit and to at least one output terminal of said circuit.

According to an embodiment, the terminal comprises an antenna, common to the transmission and to the reception, connected to two input terminals of a control and processing circuit and to two output terminals of said circuit.

According to an embodiment, a spectrum spreading element is interposed between the antenna and each input terminal of the control and processing circuit.

According to an embodiment, the terminal further comprises a low-pass filter at each input of the control and processing circuit.

According to an embodiment, a resistive element is arranged in parallel with each spectrum spreading element.

According to an embodiment, the spectrum spreading element is a rectifying element.

According to an embodiment, the rectifying element is a diode.

An embodiment further provides a method of reception of a communication by a terminal of a near-field communication system, wherein the received signal is submitted to a spectrum spreading.

An embodiment further provides a near-field communication system comprising a terminal of the type described herein and a transponder.

A device may comprise: an antenna configured to transmit and receive near-field communication signals and to couple to a near-field communication controller; and at least one spectrum spreading element coupled to the antenna and configured to spread a spectrum of a signal received by the antenna. The antenna may be configured to couple to at least one input terminal of the near-field communication controller and to at least one output terminal of the near-field communication controller. The antenna may be configured to couple to two input terminals and to two output terminals of the near-field communication controller. The at least one spectrum spreading element may comprise a first spectrum spreading element coupled between the antenna and a first input terminal of the near-field communication controller and a second spectrum spreading element coupled between the antenna and a second input terminal of the near-field communication controller. The device may comprise a first resistive element coupled in parallel with the first spectrum spreading element and a second resistive element coupled in parallel with the second spectrum spreading element. The device may comprise a low-pass filter at the two inputs of the near-field communication controller. The at least one spectrum spreading element may comprise a rectifying element. The rectifying element may comprise a diode.

A method may comprise: receiving, by a near-field communication device, a near-field communication signal; spreading, by the near-field communication device, a spectrum of the received near-field communication signal; and processing, by the near-field communication device, the spread-spectrum signal. The method may comprise low-pass filtering the received near-field communication signal. The method may comprise transmitting an output near-field communication signal.

A system may comprise: a near-field communication control block; an antenna configured to transmit and receive near-field communication signals and to couple to the near-field communication control block; and at least one spectrum spreading element coupled between the antenna and the near-field communication control block and configured to spread a spectrum of a signal received by the antenna. The antenna may be configured to couple to at least two input terminals and to at least two output terminals of the near-field communication control block. The at least one spectrum spreading element may comprise a first spectrum spreading element coupled between the antenna and a first input terminal of the near-field communication control block and a second spectrum spreading element coupled between the antenna and a second input terminal of the near-field communication control block. The system may comprise a first resistive element coupled in parallel with the first spectrum spreading element and a second resistive element coupled in parallel with the second spectrum spreading element. The system may comprise a low-pass filter configured to filter an input signal of the near-field communication control block. The at least one spectrum spreading element may comprise a rectifying element. The rectifying element may comprise a diode. The diode may be a Schottky diode. The system may comprise a transponder configured to communicatively couple to the antenna.

A system may comprise: means for receiving a near-field communication signal; means for spreading a spectrum of the received near-field communication signal; and means for processing the spread-spectrum signal. The system may comprise: means for filtering the received near-field communication signal. The means for receiving may be configured to transmit an output near-field communication signal.

DETAILED DESCRIPTION

Figure 1:
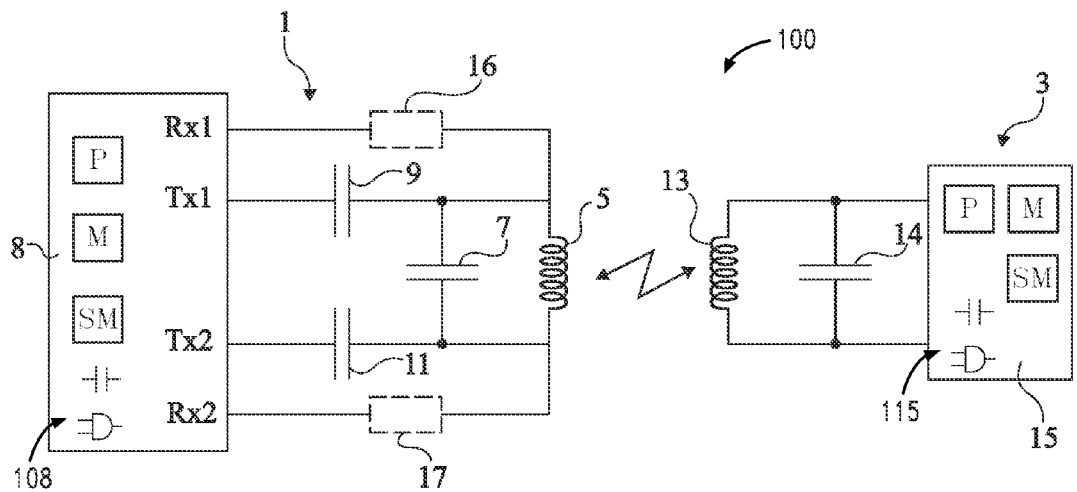
FIG. 1 schematically shows a near-field communication system comprising a terminal and a transponder.

In the following description, numerous specific details are given to provide a thorough understanding of embodiments. The embodiments can be practiced without one or more of the specific details, or with other methods, components, materials, etc. In other instances, well-known structures, materials, or operations, such as, for example, transistors, antennas, transponders, processors, diodes, controllers, power supplies, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The same elements have been designated with the same reference numerals in the different drawings, unless the context indicates otherwise. For clarity, only those elements which are useful to the understanding of the embodiments which will be described have been shown and will be detailed. For example, the generation of the signals to be transmitted by a terminal has not been detailed, the described embodiments being compatible with usual transmissions. Further, circuits for using the signals received by the terminal have not been detailed either, the described embodiments being here again compatible with the current use of such transmissions.

FIG. 1 schematically shows a near-field communication system 100 comprising a terminal 1 and a transponder 3 within the range of the terminal.

Terminal 1 comprises an oscillating circuit, for example, parallel, formed of an inductive element 5 forming an antenna, for example, an inductance, in parallel with a capacitive element 7, for example, a capacitor. The oscillating circuit is arranged between two output terminals Tx1 and Tx2 of a control and processing circuit of terminal 1, schematically shown by a block 8. Circuit 8 comprises different electronic circuits necessary to generate transmissions from the terminal to the transponder and to exploit the data received from the transponder. As illustrated, circuit 8 comprises a processor P, a memory M, a state machine SM and discrete circuitry 108. The oscillating circuit of terminal 1 is intended to radiate a high-frequency electromagnetic field towards transponder 3. Capacitors 9, 11, intended to filter the common mode, are arranged between the oscillating circuit and each terminal Tx1, Tx2. Antenna 5 is also connected to two input terminals Rx1 and Rx2 of circuit 8 of terminal 1. Antenna 5 is thus used both to transmit and to receive a communication.

Transponder 3 comprises an oscillating circuit, for example, parallel, formed of an inductive element 13 forming an antenna, for example, an inductance, in parallel with a capacitive element 14, for example, a capacitor. This oscillating circuit is intended to detect the radio frequency field radiated by terminal 1. The transponder circuits are schematically shown by a block 15 and comprise different electronic circuits necessary for the exploitation of the data received from the terminal and for the generation of transmissions from the transponder to the terminal. As illustrated, block 15 comprises a processor P, a memory M, a state machine SM and discrete circuitry 115.

In such a near-field communication system, terminal 1 generates a communication in the form of an electromagnetic field intended to be detected by transponder 3. Terminal 1 may also power transponder 3. Transponder 3 uses the data received from the terminal and generates in turn a communication towards terminal 1 by retromodulation of the electromagnetic field.

The communication from terminal 1 to transponder 3 is for example performed in amplitude modulation of a high-frequency carrier, for example, on the order of 13.56 MHz. The oscillating circuits of the terminal and of the transponder are generally tuned to the carrier frequency.

The communication from transponder 3 to terminal 1 is generally performed at the rate of a sub-carrier at a frequency which is, for example, on the order of 847 kHz, by modulating the load formed by the transponder circuits in the field.

In a near-field communication system of the type illustrated in FIG. 1, since antenna 5 of the terminal is common to the reception and to the transmission of a communication, the voltage between terminals Rx1 and Rx2 corresponds to the voltage across antenna 5, and thus to the voltage between terminals Tx1 and Tx2 multiplied by the overvoltage factor introduced by the oscillating circuit. To avoid exceeding the voltage withstood by the terminal receive circuit, for example, a voltage on the order of 30 V between terminals Rx1 and Rx2, the excitation voltage of the oscillating circuit thus has to be limited. This results in limiting the system range.

To facilitate increasing the excitation voltage of the oscillating circuit of the terminal, and thus the system range, a solution is to interpose resistors 16, 17 (in dotted lines in FIG. 1) between antenna 5 of the terminal and each terminal Rx1, Rx2. This causes a voltage drop of the signal received on terminals Rx1 and Rx2. The amplitude of the signal carrier is decreased, as well as that of the useful signal. This results in limiting the terminal sensitivity.

Figure 2:
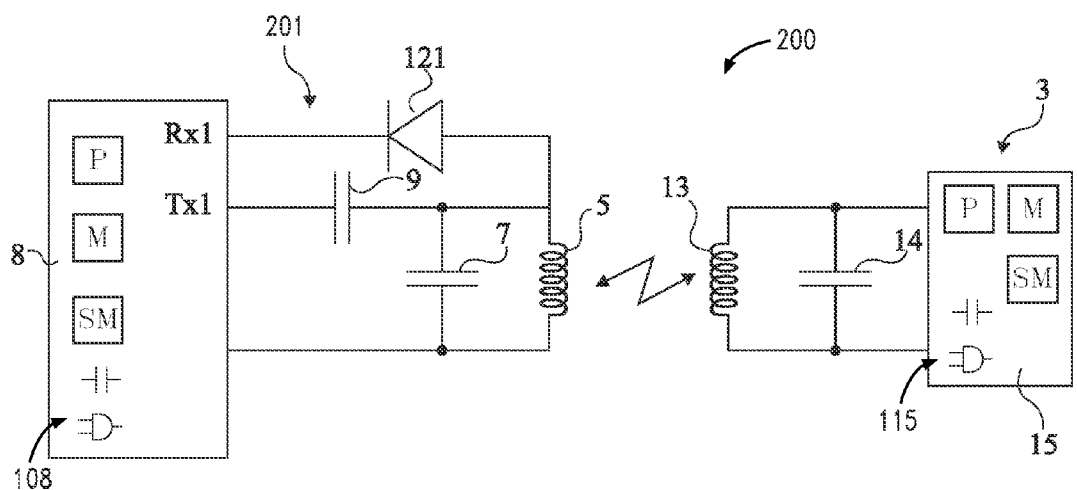
FIG. 2 schematically shows an embodiment of a near-field communication system comprising a terminal and a transponder.

FIG. 2 schematically shows an embodiment of a near-field communication system 200 facilitating increasing the excitation voltage of the oscillating circuit of the terminal 201, and thus the system range.

The amplitude of the signal received by the terminal 201 is decreased by arranging spectrum spreading elements between the antenna and each terminal Rx1, Rx2.

In the shown example, terminal 201 is used as a simple input and control and processing circuit 8 of terminal 201 thus as illustrated comprises a single input terminal Rx1 and a single output terminal Tx1.

A spectrum spreading element 121 is interposed between antenna 5 and terminal Rx1. Spectrum spreading element 121 is, for example, a rectifying element, for example, a diode, for example a Schottky diode.

Diode 121 is selected according to the operating frequency of the system.

Figure 3A:
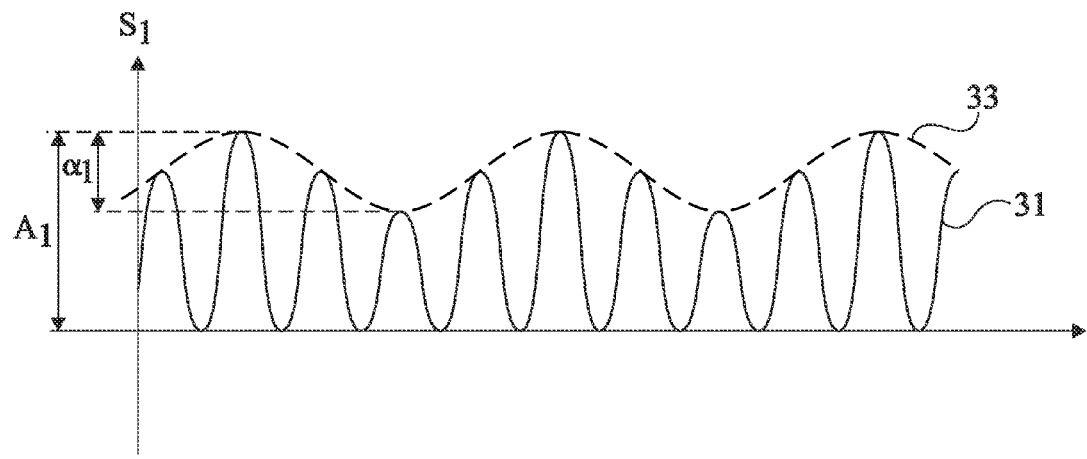
FIGS. 3A and 3B are timing diagrams respectively illustrating the operation of the system of FIG. 1 and of the system of FIG. 2.
Figure 3B:
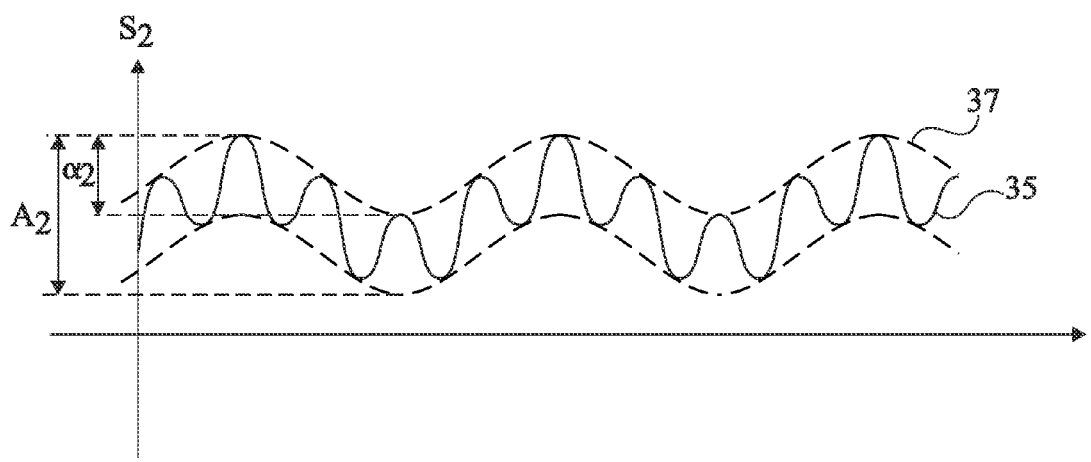

FIGS. 3A and 3B are timing diagrams showing examples of signals $S_1$ and $S_2$ received by the terminals 1, 201, respectively in the case of the system 100 of FIG. 1 and in the case of the system 200 of FIG. 2.

Figure 4A:
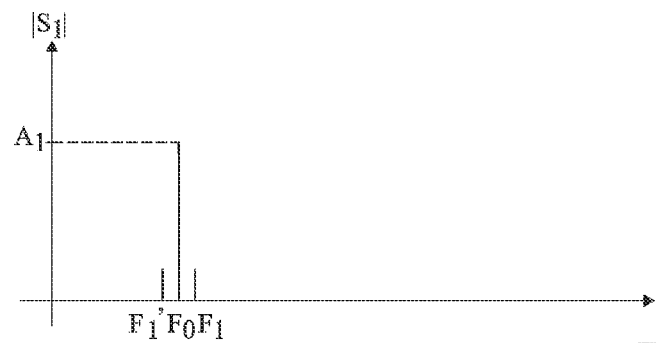
FIGS. 4A and 4B, respectively corresponding to FIGS. 3A and 3B, are spectral representations of an example of a signal processed by the terminal.
Figure 4B:
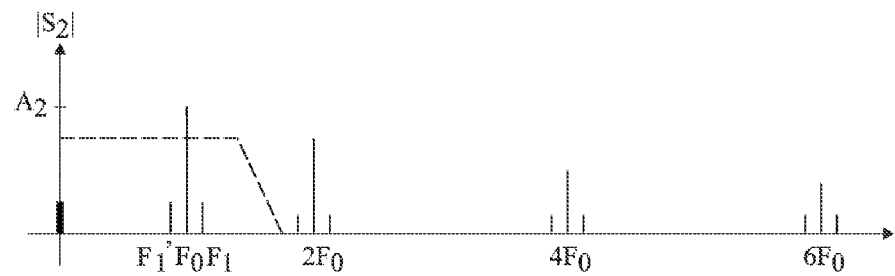

FIGS. 4A and 4B, respectively corresponding to FIGS. 3A and 3B, are spectral representations of signals $S_1$ and $S_2$.

FIG. 3A illustrates carrier 31 and modulation signal 33 of signal $S_1$ received on terminal Rx1.

In FIG. 4A, the modulus of signal $S_1$ comprises a main component at frequency $F_0$ of carrier 31, for example, approximately 13.56 MHz. The signal further comprises two secondary components at frequencies $F_1 = F_0 + F_2$ and $F_1' = F_0 - F_2$, $F_2$ corresponding to the frequency of modulation signal 33, for example, approximately 847 kHz.

FIG. 3B illustrates carrier 35 and modulation signal 37 of signal $S_2$ received on terminal Rx1.

In FIG. 4B, under the effect of the spectrum spreading, the modulus of signal $S_2$ comprises a main component at frequency $F_0$ of carrier 35 and harmonics at frequencies $2F_0$, $4F_0$, $6F_0$, etc. The signal also comprises a low D.C. component. Amplitude $A_2$ of carrier 35 of signal $S_2$ is thus decreased with respect to amplitude $A_1$ of carrier 31 of signal $S_1$. This is also visible in FIGS. 3A-3B.

Further, as shown in FIGS. 3A-3B, amplitude $\alpha_2$ of modulation signal 37 of signal $S_2$ is substantially the same as amplitude $\alpha_1$ of modulation signal 33 of signal $S_1$. Spectrum spreading element 121 thus facilitates decreasing the amplitude of the signal received by the terminal without decreasing the terminal sensitivity.

To keep the main component of signal $S_2$ and suppress the harmonics, it is possible to use a low-pass filter (an example attenuation contour is shown in dotted lines in FIG. 4B). This is optional, since very high frequency harmonics are already outside of the bandwidth of the terminal receive circuit.

Figure 5:
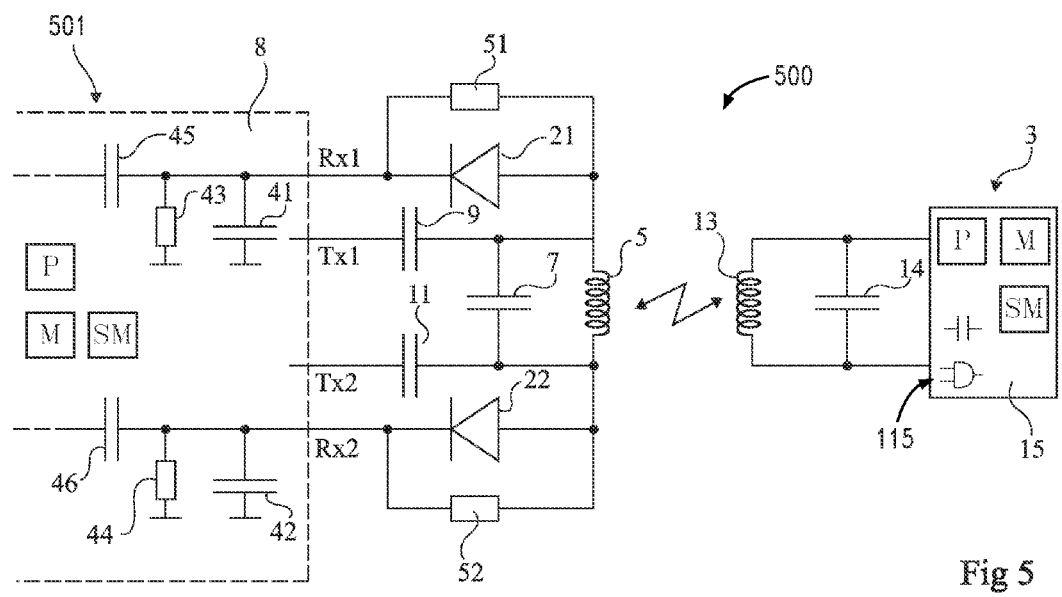
FIG. 5 schematically shows another embodiment of a near-field communication system comprising a terminal and a transponder.

FIG. 5 schematically shows another embodiment of a near-field communication system 500.

Terminal 501 is here used in differential mode and control and processing circuit 8 comprises two input terminals Rx1 and Rx2 and two output terminals Tx1 and Tx2.

Spectrum spreading elements 21, 22, for example, rectifying elements, for example, diodes, are interposed between antenna 5 of terminal 501 and each terminal Rx1, Rx2.

FIG. 5 illustrates the variation according to which, to further decrease the amplitude of the signal received by the terminal, low-pass filters are used. Advantage is here taken of the presence of low-pass filters which generally exist at the input of control and processing circuit 8 of terminal 501, on terminals Rx1 and Rx2. Such low-pass filters may, for example comprise capacitive elements 41 (42), 45 (46) and a resistive element 43 (44). As illustrated, circuit 8 comprises a processor P, a memory M and a state machine SM in addition to the illustrated discrete circuitry. As illustrated, circuit 15 comprises a processor P, a memory M, a state machine SM and discrete circuitry 115.

As an example of order of magnitude, resistive elements 43, 44 for example may be resistors with a value on the order of 40 kΩ and capacitive elements 41, 42, 45, 46 may be for example capacitances with a value ranging between 20 and 40 pF.

According to another variation, to further adjust the amplitude of the signal received by the terminal 501, resistive elements 51, 52, for example, resistors, are respectively arranged in parallel with spectrum spreading elements 21, 22. This sets the frequency of the low-pass filter created with antenna 5.

Resistors 51, 52 for example may have a value on the order of 1.5 kΩ.

Specific embodiments have been described. Various alterations, modifications, and improvements will occur to those skilled in the art. In particular, although a near-field communication system having its terminal comprising a diode interposed between the antenna and each input terminal of the control and processing circuit has been described, any other rectifying element may be used, for example, a diode-assembled transistor. Further, various elements of these various embodiments and variations may be combined without showing any inventive step. For example, in the embodiment of FIG. 5, low-pass filters may be provided at the input of the terminal receive circuit, and resistors may be arranged in parallel with the rectifying elements, or it is possible to only provide the low-pass filters, or only the resistors, or again only the rectifying elements.

Such alterations, modifications, and improvements are intended to be part of this disclosure. Accordingly, the foregoing description is by way of example only and is not intended to be limiting.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A device, comprising:
    an antenna configured to transmit and receive near-field communication signals and to couple to at least two inputs and to at least two outputs of a near-field communication controller;
    a first spectrum spreading element coupled between the antenna and a first input terminal of the near-field communication controller;
    a second spectrum spreading element coupled between the antenna and a second input terminal of the near-field communication controller;
    a first resistive element coupled in parallel with the first spectrum spreading element;
    a second resistive element coupled in parallel with the second spectrum spreading element: and
    a low-pass filter at each of the at least two inputs of the near-field communication controller.

2. The device of claim 1 wherein the at least one spectrum spreading element comprises a rectifying element.

3. The device of claim 2 wherein the rectifying element comprises a diode.

4. A method, comprising:
    receiving, by a near-field communication device, a differential near-field communication signal;
    spreading, by the near-field communication device, a spectrum of the received near-field communication signal; and processing, by the near-field communication device, the spread-spectrum signal, the processing including low-pass filtering of the spread-spectrum signal, wherein the low-pass filtering the spread-spectrum signal comprises using first and second low-pass filters, and the differential near-field communication signal is received at an input of a first spectrum spreading element and an imput of a second spectrum spreading element, where an output of the first spectrum spreading element is coupled to the first low-pass filter, an output of the second spectrum spreading element is coupled to the second low-pass filter. a first resistive element is coupled in parallel with the first spectrum spreading element and a second resistive element is coupled in parallel with the second spectrum spreading element.

5. The method of claim 4, comprising:
transmitting, by the near-field communication device, an output near-field communication signal.

6. The method of claim 4, comprising:
generating, using a transponder, the differential near-field communication signal.

7. A system, comprising:
a near-field communication control block;
an antenna configured to transmit and receive near-field communication signals and to couple to at least two inputs and at least two outputs of the near-field communication control block;
a first spectrum spreading element coupled between the antenna and a first input terminal of the near-field communication control block;
a second spectrum spreadin element coupled between the antenna and a second input termininal of the near-field communication control block;
a first resistive element coupled in parallel with the first spectrum spreading element; and
a second resistive element coupled in parallel with the second spectrum spreading element, wherein each of the at least two inputs of the near-field communication control block comprises a low-pass filter.

8. The system of claim 7 wherein the at least one spectrum spreading element comprises a rectifying element.

9. The system of claim 8 wherein the rectifying element comprises a diode.

10. The system of claim 9 wherein the diode is a Schottky diode.

11. The system of claim 7, comprising:
a transponder configured to communicatively couple to the antenna.

12. A system, comprising:
means for receiving a near-field communication signal;
means for spreading a spectrum of the received near-field communication signal;
means for low-pass filtering the spread-spectrum signal; and
means for processing the low-pass filtered signal, wherein;
the near-field communication signal is a differential signal and the means for low-pass filtering the spread-spectrum signal comprises first and second low-pass filters; and
the means for spreading the spectrum of the received near-field communication signal comprises:
a first spectrum spreading element coupled between the means for receiving and the first low-pass filter;
a second spectrum spreading element coupled between the means for receiving and the second low-pass filter;
a first resistive element coupled in parallel with the first spectrum spreading element; and
a second resistive element coupled in parallel with the second spectrum spreading element.

13. The system of claim 12 wherein the means for receiving is configured to transmit an output near-field communication signal.

14. The system of claim 12 wherein the first spectrum spreading element comprises a rectifying element.

15. The system of claim 14 wherein the rectifying element comprises a diode.

16. The system of claim 15 wherein the diode is a Schottky diode.

17. The system of claim 12, comprising:
a transponder configured to communicatively couple to the means for receiving.

* * * * *

UNITED STATES PATENT AND TRADEMARK OFFICE
CERTIFICATE OF CORRECTION

PATENT NO. : 9,516,454 B2
APPLICATION NO. : 14/629077
DATED : December 6, 2016
INVENTOR(S) : Thierry Meziache Page 1 of 1

It is certified that error appears in the above-identified patent and that said Letters Patent is hereby corrected as shown below:

In the Claims

Column 7, Lines 8-9:
"element and an imput of a second spectrum spreading element, where an output of the first spectrum spreading" should read, --element and an input of a second spectrum spreading element, wherein an output of the first spectrum spreading--.

Signed and Sealed this
Twenty-eighth Day of February, 2017

Michelle K. Lee
*Director of the United States Patent and Trademark Office*